United States Patent [19]

Basore

[11] Patent Number: 4,560,136

[45] Date of Patent: Dec. 24, 1985

[54] SUPPORT FOR HI-FI TURNTABLE BASE

[76] Inventor: William T. Basore, 1610 Berkshire Dr., Stillwater, Okla. 74047

[21] Appl. No.: 718,819

[22] Filed: Apr. 1, 1985

Related U.S. Application Data

[63] Continuation of Ser. No. 338,338, Jan. 11, 1982, abandoned.

[51] Int. Cl.$^4$ ............................................. F16F 15/08
[52] U.S. Cl. ................................... 248/559; 248/631; 248/636; 248/638
[58] Field of Search ............... 248/559, 560, 631, 636, 248/638

[56] References Cited

U.S. PATENT DOCUMENTS

| | | | |
|---|---|---|---|
| 804,884 | 11/1905 | Rutan | 248/619 |
| 2,076,071 | 4/1937 | Debolt | 248/631 |
| 2,441,509 | 5/1948 | Robinson | 248/634 |
| 3,351,027 | 11/1967 | Ellard | 248/631 |
| 3,425,652 | 2/1969 | Leary | 248/638 |
| 3,679,159 | 7/1972 | Bach | 248/631 |
| 4,403,762 | 9/1983 | Cogswell | 248/659 |
| 4,406,344 | 9/1983 | Fukushima | 248/559 |
| 4,424,961 | 1/1984 | Takei | 248/559 |
| 4,424,961 | 1/1984 | Takei | 248/559 |

FOREIGN PATENT DOCUMENTS

| | | | |
|---|---|---|---|
| 247505 | 6/1912 | Fed. Rep. of Germany | 248/613 |
| 853998 | 4/1940 | France | 248/631 |
| 2088996 | 6/1982 | United Kingdom | 248/631 |
| 578511 | 10/1977 | U.S.S.R. | 248/559 |

Primary Examiner—Reinaldo P. Machado
Assistant Examiner—Alvin Chin-Shue
Attorney, Agent, or Firm—Head, Johnson & Stevenson

[57] ABSTRACT

A support for a hi-fi turntable base or the like and having an open frame member disposed adjacent the upper surface of a base plate member, a fluid filled endless tube member disposed on the upper surface of the base member and within the interior of the frame and preferably arranged in a serpentine configuration to achieve a proper disbursement of the fluid during use of a support apparatus, the outer diameter of the tube being greater than the thickness of the frame whereby the tube projects above the outer limit of the frame for receiving a floating support plate thereon. A centrally disposed post or bolt extends loosely between the base plate and the floating plate for securing the floating plate to the base plate, the floating plate being adapted for receiving the turntable base thereon for isolating the turntable base from vibration caused by walking across the floor or the like, the elements of the turntable support apparatus being constructed from materials having different frequency.

5 Claims, 5 Drawing Figures

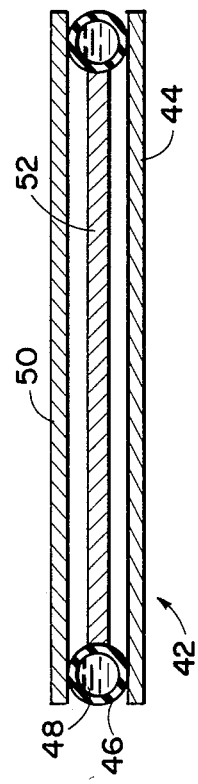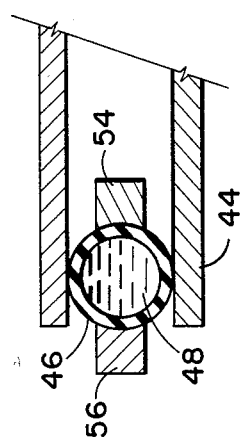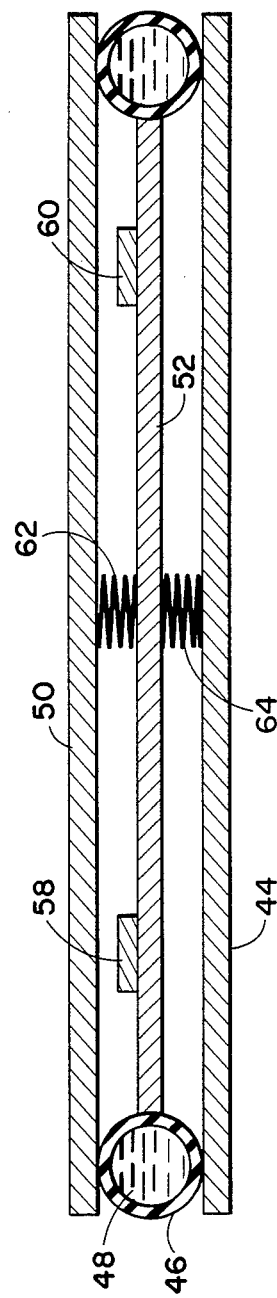

SUPPORT FOR HI-FI TURNTABLE BASE

BACKGROUND OF THE INVENTION

This is a continuation of application Ser. No. 6/338,338 filed Jan. 11, 1982, now abandoned.

1. Field of the Invention

This invention relates to improvement in support devices and more particularly but not by way of limitation to a support for isolating a turntable base or the like from ambient vibrations.

2. Description of the Prior Art

In order to improve the fidelity of hi-fi sound recordings, and the like, it has been found advantageous to provide as light an engagement between the stylus and the record surface as possible. As a consequence many of the present day styluses are usually of such a lightweight construction that the vibrations caused by a person walking across the floor or the like, will tend to make the stylus skip across the surface of the record, the disadvantages of which will be apparent. In order to overcome this problem support devices have been developed such as those disclosed in the Bach et al, U.S. Pat. No. 3,679,159; DeBolt, U.S. Pat. No. 2,076,071; Iller, U.S. Pat. No. 3,491,977; Robinson, U.S. Pat. No. 2,441,509; Leary, U.S. Pat. No. 3,425,652; and Ellard, Jr., et al U.S. Pat. No. 3,351,027. These patents all disclose a base means separated from a support surface by means of a vibration isolation bladder, tube or the like. Whereas these devices appear to absorb ambient vibrations and afford a certain amount of protection for the lightweight stylus or the like, it is apparent that additional vibration dispensing means can further improve the support of a hi-fi base, or the like.

SUMMARY OF THE INVENTION

The present invention contemplates a novel support for a turntable base or the like which has been particularly designed and constructed for isolating the base from vibrations surrounding the base in a more efficient manner than heretofor possible. The novel support system comprises an open frame member disposed adjacent the upper surface of a base plate member and having an endless inflated tube member disposed within the interior of the frame. The endless tube member is preferably filled with suitable fluid and is preferably arranged in a substantially serpentine manner to achieve the proper disbursement of the fluid within the tube during the use of the support assembly. The outer diameter of the tube is of a greater thickness than that of the frame wherein it is disposed in order that the tube may project above the outer limit of the frame for yieldably supporting plate member which receives the turntable base thereon. The support plate is secured to the base plate by means of suitable bolts extending loosely through aligned bores provided in the support plate and base plate. In this manner the support plate may move vertically upwardly and downwardly with respect to the base in response to ambient vibrations for isolating substantially all external vibrations from the turntable disposed on the support plate. In addition, weight means may be secured or added to the fluid filled tube member for further dissipating any external vibration and substantially eliminating vibration of the turntable to reduce skipping of the stylus across the face of a record as the record is being played on the turntable. The novel support means for a hi-fi turntable base or the like is simple and efficient in operation and economical and durable in construction.

BRIEF DESCRIPTION OF THE DRAWINGS

FIG. 3 is a sectional elevational view of a portion of a modified turntable base support structure embodying the invention.

FIG. 4 is a broken sectional elevational view of a further modification of turntable base support structure embodying the invention.

FIG. 5 is an enlarged sectional elevational view of a portion of a still further modified turntable base support structure embodying the invention.

DETAILED DESCRIPTION OF THE PREFERRED EMBODIMENT

Figure 1:
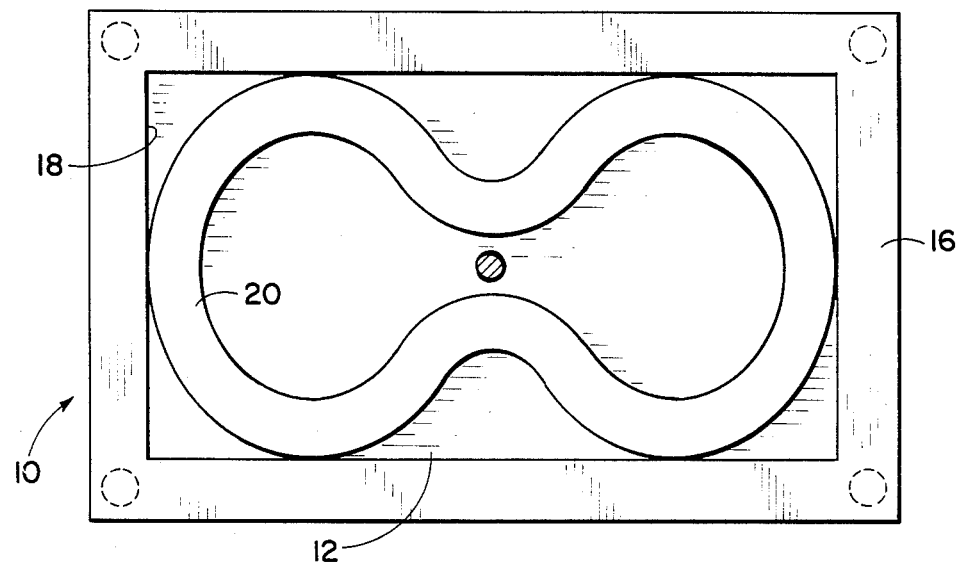
FIG. 1 is a plan view of a turntable base support means embodying the invention with portions thereof eliminated for purposes of illustration.
Figure 2:
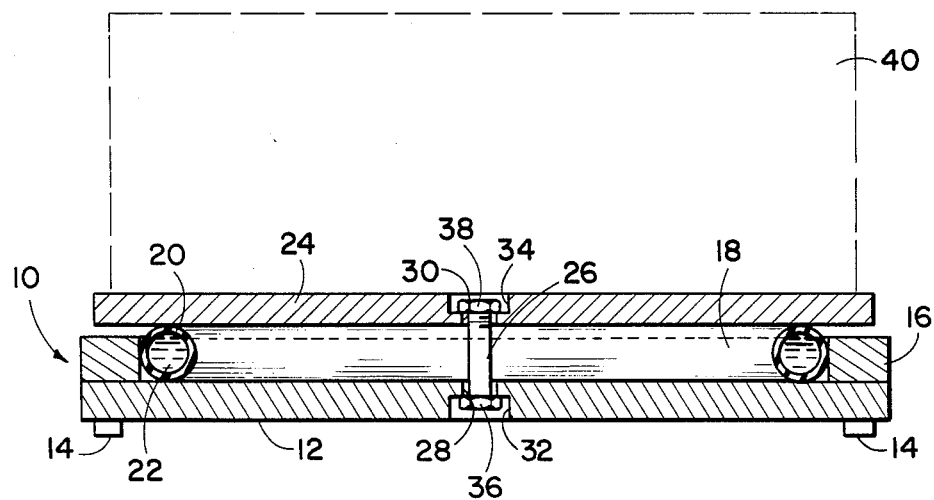
FIG. 2 is a sectional elevational view of a turntable base support structure embodying the invention with portions depicted in broken lines for purposes of illustration.

Referring to the drawings in detail and particularly FIGS. 1 and 2, reference character 10 generally indicates a turntable base support apparatus comprising a base plate 12 preferably of substantially rectangular configuration, but not limited thereto, and supported by suitable spaced leg members 14 as is well known. An open frame means 16 is secured to the upper face of the base 12 in any suitable manner (not shown) and extends around the outer periphery thereof as particularly shown in FIG. 1 providing an open area 18 centrally disposed above the upper surface of the plate 12. An endless tube member 20 is disposed in the open area 18 and rests on the upper surface of the base 12 as particularly shown in FIG. 2. The tube member 20 is preferably constructed from a suitable yieldable material such as rubber or the like and is filled with any suitable fluid 22 such as a water/glycol mixture. The fluid 22 is preferably selected of the optimum frequency liquid in accordance with the ultimate end use of the support apparatus 10 as will be hereinafter set forth. In addition, the endless tube 20 is preferably disposed on the upper surface of the base 12 in a substantially serpentine manner for assuring an optimum dispersion of the fluid 22 contained therein.

The outer diameter of the tube 22 is preferably greater than the height of the frame 16 whereby the tube 20 normally projects above the upper limit of the frame 16 as shown in FIG. 2. A floating support plate 24 is disposed against the protruding or exposed outer periphery of the tube 20 and in spaced relation with respect to the outer face of the frame 16. The plate 24 may be floatingly secured to the base member 12 in any suitable manner such as by bolt means 26 extending loosely through aligned apertures 28 and 30 provided in the base 12 and 24, respectively. The bores 28 and 30 are preferably enlarged as shown at 32 and 34, respectively, whereby the head 36 of the bolt 26 and cooperating lock nut 38 may be disposed in the enlarged portions 32 and 34, respectively, for limiting the movement of the floating plate 24 in a direction away from the base 12.

Whereas it is preferable to select the fluid 22 of the optimum frequency as hereinbefore set forth it is also preferable that the base 12, frame 16, and floating support plate 24 each be constructed from a material of a different frequency than that from which the other components are constructed. Furthermore it will be readily apparent that the support structure 10 may be constructed in a sufficiently large size as to support an entire turntable 40 as shown in broken lines in FIG. 2 or may be constructed in miniature whereby an independent support apparatus 10 may be disposed under each support foot of the turntable 40 itself.

In use the turntable 40 or support leg therefore may be disposed on the upper surface of the floating support plate 24. The base 12, in turn, may be disposed on any suitable support surface such as a floor, a table or the like, as is well known, with the feet or legs 14 supporting the base 12 in spaced relation with respect thereto. Any vibrations transmitted to the base 12 will be absorbed by the tube 20 and floating support member 24. The support plate 24 may move reciprocally in a vertical direction with respect to the base plate 12 by virtue of the connection therebetween by the bolts 26 and cooperating apertures 28 and 30. In this manner substantially all vibrations caused by walking or other ambient actions are isolated from the turntable base 40.

Referring now to FIG. 3 a modified turntable base support is generally indicated at 42 and comprises a base member 44 generally similar to the base 12 and having an endless tube 46 and disposed on the upper surface therefore in the manner generally similar to that hereinbefore set forth. The tube 46 is preferably filled with a suitable liquid of the optimum frequency as required for the operation of the device 42 and as hereinbefore set forth. A support plate 50 is disposed against the exposed upper periphery of the tube 46 and is thus yieldably supported in spaced relation with respect to the base member 44. Here again it may be preferable to dispose the endless tube 46 in a generally serpentine manner on the upper surface of the base 44 but there is no intention to limit the invention to the serpentine arrangement. A weight member 52 which may be in the form of an internal platform secured to the inner periphery of the tube 46 is interposed between the base member 44 and support plate 50 for functioning in the manner of a pendulum or the like, to further dissipate vibration and isolate the turntable base 40 from ambient vibration.

As shown in FIG. 4 weight means 54 and 56 may be secured to the outer periphery and inner periphery of the tube 46 and may either comprise a plurality of spaced weight elements or a continual substantially annular arrangement as desired. Of course in the event the frame 16 is utilized it may be preferable to provide only the weight means 54 on the inner periphery of the tube 46, whereas if the frame 16 is omitted both the inner and outer weights 54 and 56 may be utilized, or only the outer weights 56.

As shown in FIG. 5 the weight member 52 may be "tuned" by adding additional weight members 58 and 60 secured or otherwise carried by the weight member 52. The weights 58 and 60 may comprise a plurality of spaced elements or may be a single essentially annular member secured to or disposed on one side of the weight member 52. A further tuning may be accomplished by the addition of suitable helical spring members 62 and 64 disposed on opposite sides of the weight member 52 and interposed between the weight member 52 and base member 44 and support plate 50 as particularly seen in FIG. 5. Of course it will be apparent either the spring 62 or spring 64 may be utilized independently or both springs 62 and 64 may be utilized as desired.

Of course, it will be apparent that the tube 20 or 46 may be incorporated as a part of the turntable (not shown) per se, if desired, or may be incorporated as an integral part of a basic piece of furniture (not shown) which may house the turntable, and still function to isolate the turntable from ambient vibrations and the associated disadvantages. It is to be noted, also, that feedback is a problem in audio equipment, the predominate problem of feedback being resonance or resonate frequency. The tube 20 or the tube 46 isolate the turntable or turntable base from the vibrations which may be produced by speakers (not shown) to substantially eliminate feedback in the audio system.

From the foregoing it will be apparent that the present invention provides an improved support for a turntable base, or the like, in order to more efficiently isolate the turntable from ambient vibrations, thus essentially eliminating or substantially reducing skipping of a stylus across the surface of a record being played on the turntable, and eliminating feedback problems in the audio system. The novel device comprises base means having endless fluid filled tube means supported on the upper face thereof and support plate means yieldably supported in spaced relation with respect to the base, said support plate means being adapted for receiving the turntable base thereon, thus essentially isolating the turntable from ambient vibrations. It is important that the fluid disposed in the endless tube be of a selected frequency to provide optimum results and it is further important that the elements of the apparatus be constructed from materials having different frequencies in order to provide optimum protection against vibration for the turntable supported thereby.

Whereas the present invention has been described in particular relation to the drawings attached hereto, it should be understood that other and further modifications, apart from those shown or suggested herein may be made within the spirit and scope of this invention.

What is claimed is:

1. In a vibration isolating apparatus for turntables the specific improvement comprising: support means comprising a base member, a single fluid filled endless tube freely disposed on the upper surface of the base means, floating support plate means independent of the base member and yieldably supported directly on the endless tube means for receiving the turntable thereon to isolate vibrations therefrom, and weight means comprising a plate secured to the inner periphery of the endless tube means for further dissipating the vibrations.

2. A support apparatus as set forth in claim 1 wherein the endless tube means is filled with a fluid having a preselected frequency.

3. A support apparatus as set forth in claim 2 wherein the endless tube means is arranged in a substantially serpentine configuration for proper dispersement of the fluid.

4. A support apparatus as set forth in claim 1 wherein the plate is of a substantially annular configuration.

5. In a vibration isolating apparatus for turntables the specific improvement comprising: support means comprising a base member, a single fluid filled endless tube freely disposed on the upper surface of the base means, floating support plate means independent of the base member and yieldably supported directly on the endless tube means for receiving the turntable thereon to isolate vibrations therefrom, and weight means secured to the inner periphery of the endless tube for further dissipating the vibrations.

* * * * *